United States Patent [19]

Budzich et al.

[11] 4,353,559
[45] Oct. 12, 1982

[54] LABYRINTH SEAL

[75] Inventors: Mieczyslaw Budzich, Lexington; Forest G. Fitz, Jr., West Columbia, both of S.C.

[73] Assignee: Nassau Recycle Corporation, Staten Island, N.Y.

[21] Appl. No.: 171,632

[22] Filed: Jul. 23, 1980

[51] Int. Cl.³ ............................................. F16J 15/44
[52] U.S. Cl. ................................................. 277/53
[58] Field of Search ................................. 277/55–57, 277/191, 199

[56] References Cited

U.S. PATENT DOCUMENTS

| 1,978,739 | 10/1934 | Brittain . | |
|---|---|---|---|
| 2,643,141 | 6/1953 | Bryant . | |
| 3,357,708 | 12/1967 | Parr . | |
| 4,022,479 | 10/1977 | Orlowski | 277/53 |
| 4,149,731 | 4/1979 | Yoshida et al. | 277/199 |

Primary Examiner—Robert T. Smith
Attorney, Agent, or Firm—Robert B. Kennedy

[57] ABSTRACT

A labyrinth seal is disclosed having mutually facing stationary and rotatable members. The rotatable member is comprised of one section adapted to be mounted to a granulator rotor and another section that has a plurality of arcuate segments adapted to be passed over the rotor blade support and removably mounted to the one section.

6 Claims, 5 Drawing Figures

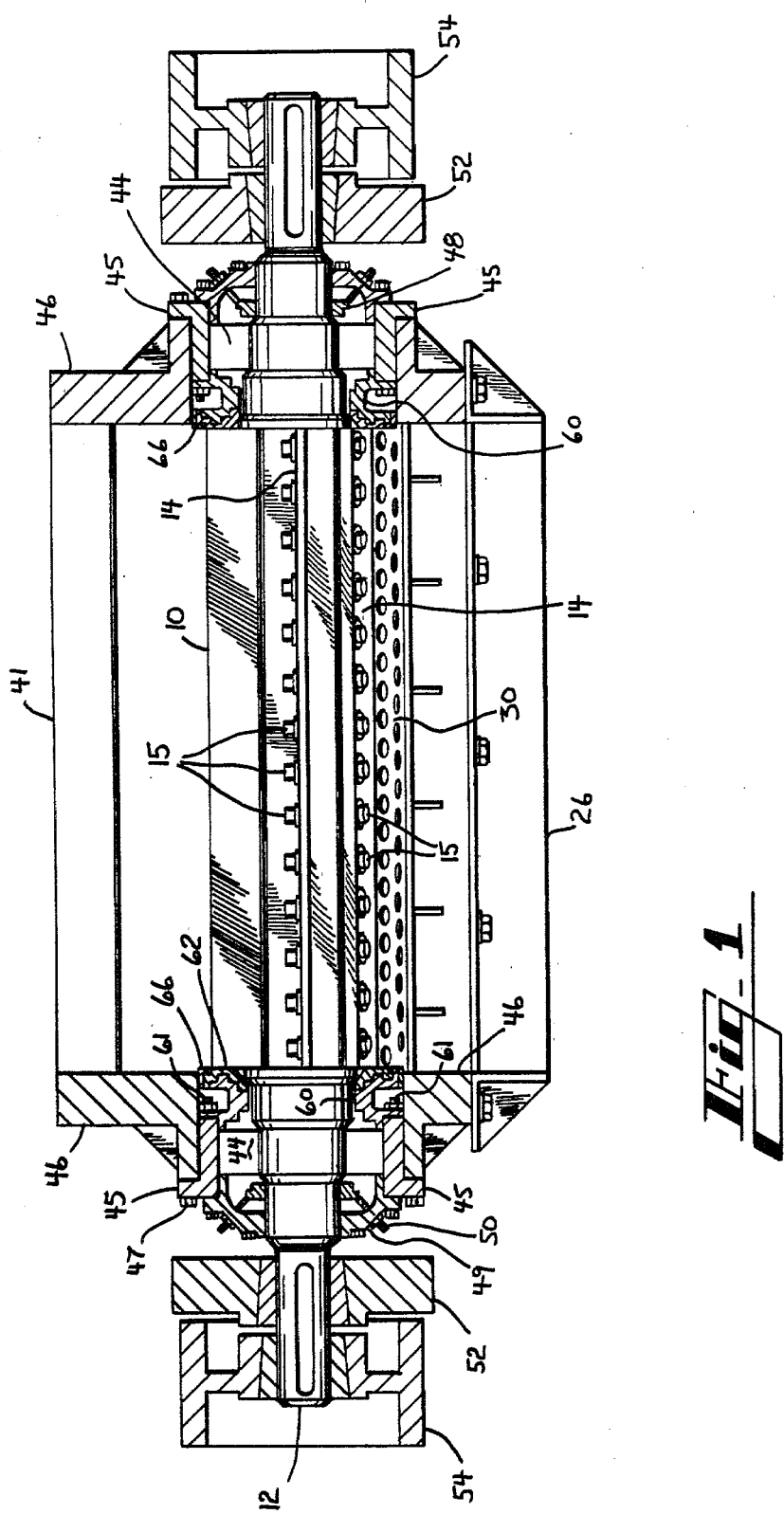
Fig_1

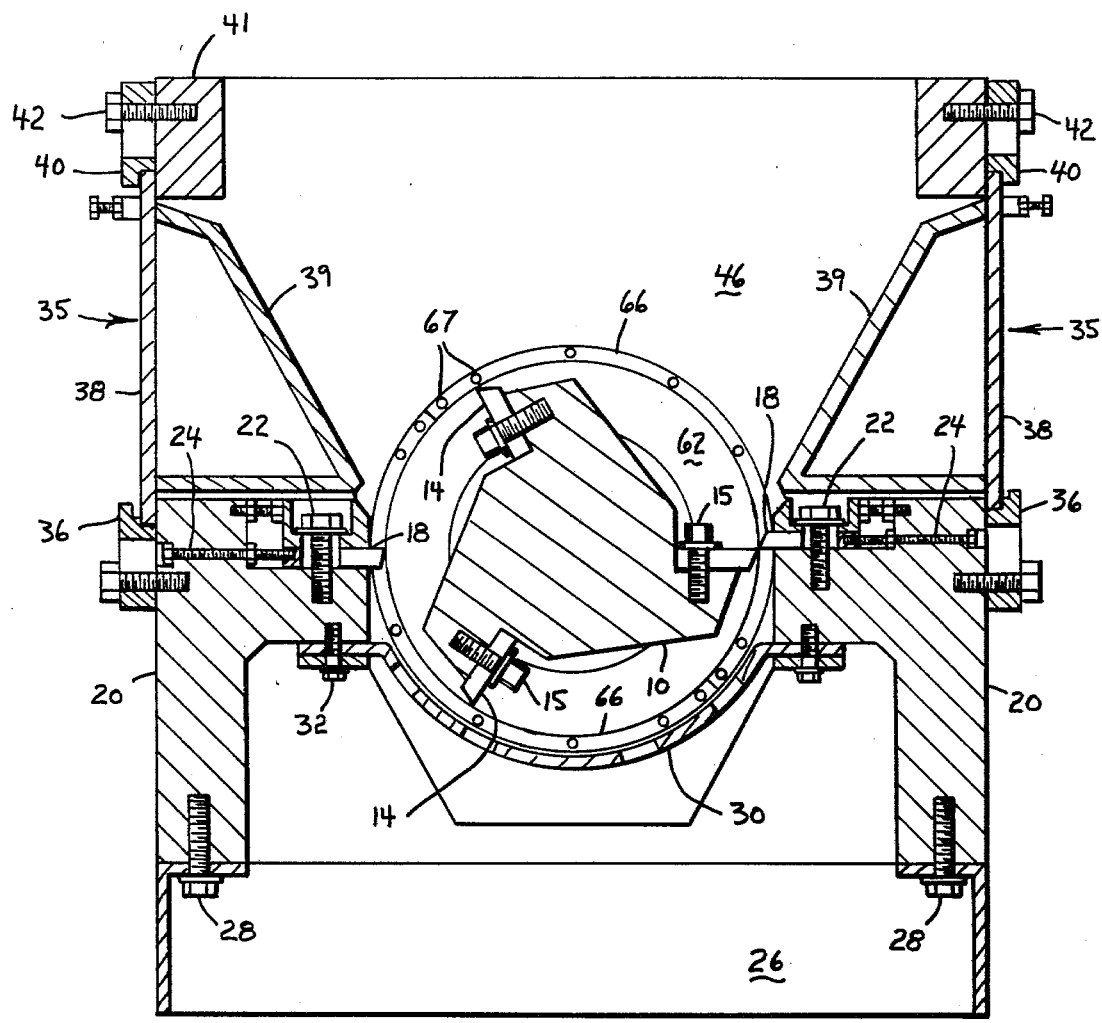
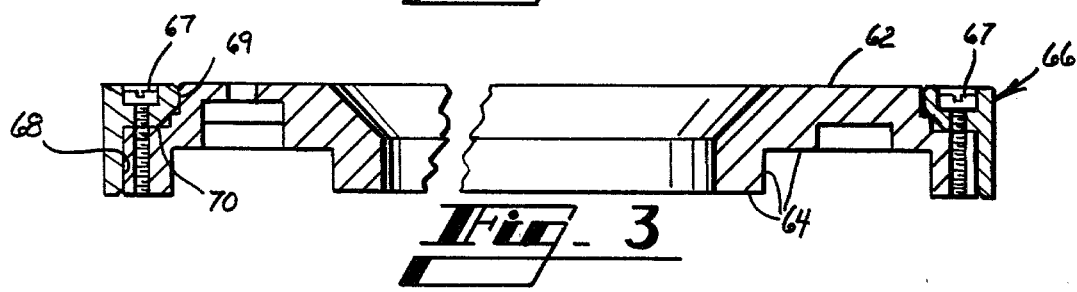

LABYRINTH SEAL

TECHNICAL FIELD

This invention relates generally to labyrinth seals, and particularily to labyrinth seals of the type employed in granulators.

BACKGROUND OF THE INVENTION

Granulators, such as those used in chopping wire and cable, typically have a blade supporting rotor whose shaft is journaled through bearings mounted to each side of the rotor blades. With one or more bed blades fixedly mounted in cutting relation with the orbit of the rotor blades rotation of the rotor may cause materials introduced into the granulator to be cut. To inhibit the cut materials from fouling these bearings the granulators have been provided with seals located adjacent the entry points of the rotor into the bearing housings. These seals have typically been of a labyrinth configuration which define a tortuous path between confronting surfaces of moving and stationary members or sections of the seals.

Although the just described granulators have performed satisfactorily it has been necessary to replace members of their labyrinth seals frequently due to the wear occasioned by the ground materials that enter into the narrow spacings between the moving sections of the seals and the bore of the housing in which the bearings are mounted. For example, typically it is necessary to change such seal members approximately twice a month for granulators operating some sixteen hours a day or so. To make such seal replacements has proven to be a arduous and time-consuming task. In order to gain access to the seal it has been necessary to remove a number of granulator components such as various sheaves, fly-wheels, bearings, bearing housing parts, and the fixed seal members that face the rotating seal members. Furthermore, this has had to be done to both ends of the shaft that straddle the blade supporting rotor section. Frequent dismounting of the bearings has also lead to bearing misalignments and failures. It would therefore be desirable to provide a labyrinth seal whose components that wear with normal granulator useage could be readily replaced and done so without dismounting of the rotor bearings. It is to this task to which the present invention is primarily directed.

SUMMARY OF THE INVENTION

In a preferred form of the invention a labyrinth seal is provided for a granulator of the type having a rotor that has a blade support from which a shaft extends through a bearing housing. The labyrinth seal comprises an annular first section adapted to be mounted to the bearing housing with a tortuous path defining face extending generally radially about the rotor shaft. An annular second section is provided adapted to be mounted to an end of the rotor blade support with a tortuous radial path defining face located closely adjacent the first section tortuous path defining face and with a rim located distal the rotor shaft. The labyrinth seal also includes an annular third section that has a plurality of arcuate segments adapted to be passed over the rotor blade support and removably mounted to the second section in a position between the second section rim and the bearing housing.

BRIEF DESCRIPTION OF THE DRAWING

FIG. 1 is a side elevational view of a granulator employing labyrinth seals constructed in accordance with the present invention with the seals and bearing housings shown in cross-section.

FIG. 2 is a transverse cross-sectional view of the granulator illustrated in FIG. 1.

FIG. 3 is an enlarged view of the rotatable members of the labyrinth seal shown in FIGS. 1 and 2.

DETAILED DESCRIPTION

Figure 4:
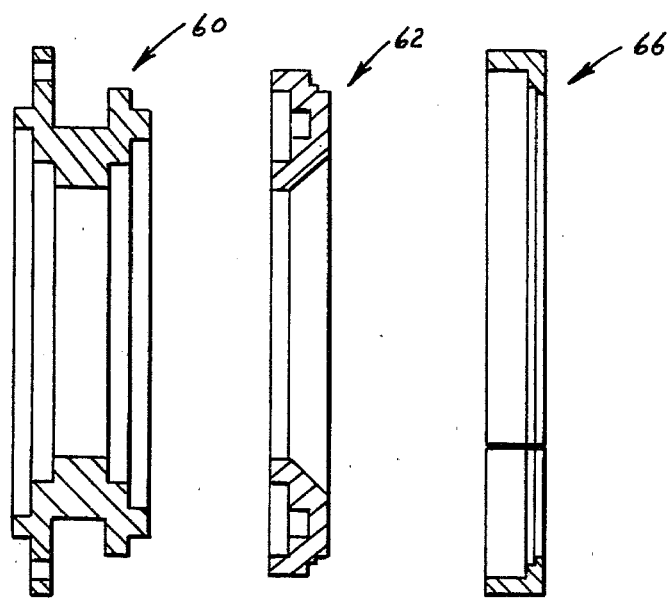
FIG. 4 is an exploded view, in cross-section, of a labyrinth seal shown in FIG. 1.
Figure 5:
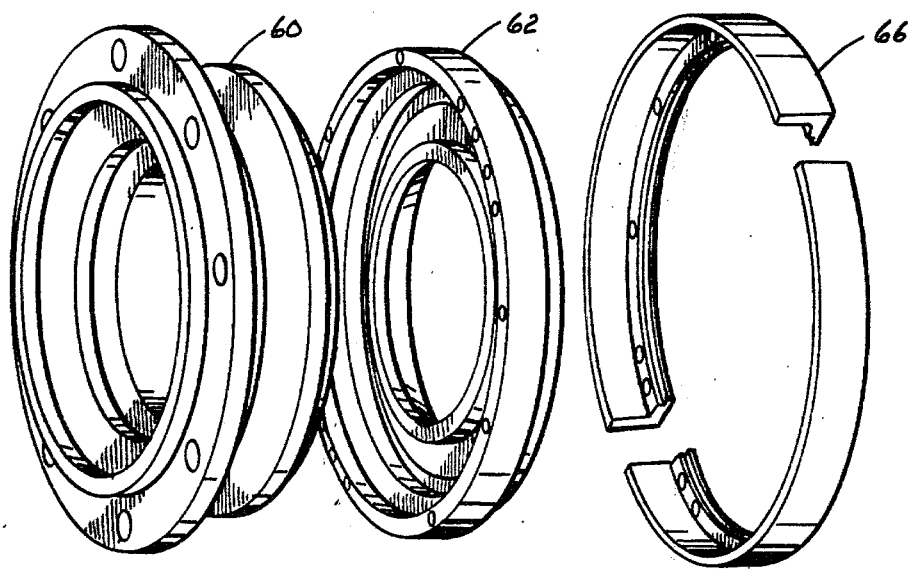
FIG. 5 is an exploded view, in perspective, of the labyrinth seal shown in FIG. 4.

Referring now in more detail to the drawing there is shown a granulator having a rotor that has a blade support section 10 from opposite sides of which a rotor shaft 12 extends. Three sets of rotatable blades 14 are mounted to the blade support section 10 by a set of bolts 15. A pair of stationary or bed blades 18 is mounted upon a support or frame member 20 with their tips closely adjacent the orbital path of the tips of the rotatable blades 14. The bed blades are secured by clamping bolts 22 and rendered position adjustable by screws 24.

The support 20 is mounted atop a frame member 26 by bolts 28. A grate 30 having a set of holes therethrough is also mounted to the support 20 by bolts 32. A pair of access doors 35 is pivotably mounted atop door clamps 36 with each access door having an outer wall 38 and an inner inclined wall 39 which serves as a chute. The tops of the doors are mounted in a closed position to door clamps 40 that are removably mounted to a granulator frame member 41 by bolts 42.

The rotor shaft 12 is journaled through roller bearings 44 which are mounted within bearing housing members 45 that are in turn secured to chamber end walls 46 by bolts 47. Oil seals 48 are mounted within oil seal housings 49 through which oil fittings 50 extend. Two fly-wheels 52 are also mounted to the rotor shaft to provide additional inertia in performing smooth granulating operations while a pair of drive sheaves 54 is mounted to the rotor shaft outboard the fly-wheels.

With continued reference to the drawing the granulator is seen also to be provided with a labyrinth seal for inhibiting granulated material from entering the bearing housing and bearings through which the rotor shaft is journaled. The labyrinth seal includes an annular first section 60 which is fixedly mounted by bolts 61 to the bearing housing 45 within the bore of the chamber end walls 46 which themselves are considered as constituting part of the bearing housing. Both of the opposed faces of this first or stationary section of the seal is seen to define a tortuous path that extends radially from the rotor shaft. The labyrinth seal also includes a second, annular, rotatable section 62 that is mountable by unshown bolt means to the ends of the rotor blade support section which section also has a face 64 which matches that of the tortuous path defining face of the first, stationary seal member 60.

The labyrinth seal also includes a third section that is made up of two semi-circular segments 66 that are removably mounted to the annular second section 62 by means of bolts 67. Each of these segments is best seen in FIG. 3 to be of stepped configuration having two cylindrical surfaces 68 and 69 of mutually diversed radii that are joined together by an annular linking surface 70.

With this configuration each segment 66 may be mounted to the seal section 62 by being passed over the rotor blades and secured by the bolt 67 with each segment positioned between the rim of seal section 62 distal the rotor shaft and the bore defining walls of the chamber end wall or bearing housing member 46.

In operation the rotor shaft is rotated by an unshown motor that drives sheaves 54 and material such as wire and cable gravitated into the granulator as through an unshown hopper mounted atop the granulator. The material is guided by the chute providing walls 39 of the doors 35 down to the bed blades 18. The material is then passed between the bed blades 18 and the rotating blades 14 which effect a cutting or granulating operation. Most of the material is then gravitated down through the grate 30 and out of the granulator.

As granulation continues some of the cut materials, dust particles and the like will tend to pass laterally between the rotating labyrinth seal members 66 and the bearing housing members 46. From here the material is inhibited from making much further progress away from the chamber in which the blades 14 are rotating due to the fact that they must follow a very tortuous path between the interfacing seal members 60 and 62. In time, however, the presence of granulated material between the rotating seal member 66 and the bearing housing will cause the seal member 66 to wear. As this wearing progresses this spacing enlarges enabling even more material to enter the tortuous path of the interfacing members.

In order to prevent the opening from becoming so large that material may actually come into contact with the bearings 45 themselves, the seal members 66 must be periodically replaced. This is easily effected with the present construction of the labyrinth seal by merely unthreading bolts 67 and removing the two seal segments 66 mounted to each side of the chamber by passing them over the rotor blades 14. In this manner it is seen that having to obtain access to the seal by removing the many component parts through which the rotor shaft is journaled is avoided including the dismounting of the rotor bearings. The time and effort thus required in changing the seal members is easily cut by an order of magnitude as compared with the prior art labyrinth seals previously described.

It should be understood that the just described embodiment merely illustrates principles of the invention in one preferred form. Many modifications, additions and deletions may, of course, be made thereto without departure from the spirit and scope of the invention as set forth in the following claims.

What is claimed is:

1. A labyrinth seal for a granulator of the type having a rotor that has a blade support from which a shaft extends through a bearing housing, and with the labryinth seal comprising an annular first section having a tortuous path defining face; an annular second section having a rim and a tortuous radial path defining face located closely adjacent said first section tortuous path defining face; and an annular third section having a plurality of arcuate segments removably mounted to said second section in a position overlaying said second section rim.

2. A labyrinth seal in accordance with claim 1 wherein said second section rim is of stepped configuration having two cylindrical surfaces of mutually diverse radii joined by an annular linking surface, and wherein each of said third section segments is configured to be placed in abutment with said second section two cylindrical and linking surfaces.

3. A labyrinth seal in accordance with claim 2 wherein said second section is provided with a plurality of threaed channels that communicate with said linking surface, and wherein each of said third section segments is provided with a channel alignable with one of said second section threaded channels whereby threaded fastening means may be inserted through the aligned channels in removably mounting the third section segments to the second section.

4. A granulator comprising a rotor that has a blade support from which a shaft extends through a bearing housing and a labyrinth seal for inhibiting cut materials from fouling the bearing, and with said seal having an annular first section adapted to be mounted to the bearing housing with a tortuous path defining face extending generally radially about the rotor shaft, an annular second section adapted to be mounted to an end of the rotor blade support with a tortuous radial path defining face located closely adjacent said first section tortuous path defining face and with a rim located distal the rotor shaft, and an annular third section having a plurality of arcuate segments adapted to be passed over said rotor blade support and removably mounted to said section section in a position between said second section rim and said bearing housing.

5. A granulator in accordance with claim 4 wherein said seal second section rim is of stepped configuration having two cylindrical surfaces of mutually diverse radii joined by an annular linking surface, and wherein each of said seal third section segments is configured to be placed in abutment with said seal second section two cylindrical and linking surfaces.

6. A granulator in accordance with claim 5 wherein said seal second section is provided with a plurality of threaded channels that communicate with said linking surface, and wherein each of said seal third section segments is provided with a channel alignable with one of said seal second section threaded channels whereby threaded fastening means may be insert through the aligned channels in removably mounting the seal third section segments to the seal second section.

* * * * *